US008824362B2

(12) United States Patent
Pradas et al.

(10) Patent No.: US 8,824,362 B2
(45) Date of Patent: Sep. 2, 2014

(54) SYSTEMS AND METHODS FOR TRANSMITTING SERVING GRANTS TO A SERVING BASE STATION

(75) Inventors: Jose Luis Pradas, Jorvas (FI); Anna Larmo, Espoo (FI); Edgar Ramos, Espoo (FI); Mats Sagfors, Kyrkslatt (FI)

(73) Assignee: Optis Wireless Technology, LLC, Plano, TX (US)

( * ) Notice: Subject to any disclaimer, the term of this patent is extended or adjusted under 35 U.S.C. 154(b) by 1064 days.

(21) Appl. No.: 12/729,704

(22) Filed: Mar. 23, 2010

(65) Prior Publication Data

US 2010/0246517 A1 Sep. 30, 2010

Related U.S. Application Data (60) Provisional application No. 61/162,732, filed on Mar. 24, 2009.

(51) Int. Cl.
*H04W 72/04* (2009.01)
(52) U.S. Cl.
CPC ................................ *H04W 72/0413* (2013.01)
USPC ........................................................ 370/319
(58) Field of Classification Search
USPC ........................................................ 307/335
See application file for complete search history.

(56) References Cited

U.S. PATENT DOCUMENTS

| 2007/0047451 | A1* | 3/2007 | Lohr et al. | 370/242 |
| 2008/0267126 | A1* | 10/2008 | Vujcic et al. | 370/330 |
| 2009/0052420 | A1* | 2/2009 | Fischer | 370/338 |
| 2009/0086659 | A1* | 4/2009 | Pani et al. | 370/310 |
| 2009/0238136 | A1* | 9/2009 | Sambhwani et al. | 370/329 |
| 2010/0130219 | A1* | 5/2010 | Cave et al. | 455/450 |

OTHER PUBLICATIONS

3rd Generation Partnership Project; Technical Specification Group Radio Access Network; Medium Access Control (MAC) Protocol Specification (Release 8), Dec. 2008, 174 pages.

* cited by examiner

*Primary Examiner* — Huy D Vu
*Assistant Examiner* — Teisha D Hall
(74) *Attorney, Agent, or Firm* — Vincent J. Allen; Carstens & Cahoon, LLP (57) ABSTRACT

The invention provides a method for transmitting a serving grant to a base station. In some embodiments the method includes: storing a serving grant in a storage unit, generating a layer two protocol data unit (L2 PDU); and transmitting the L2 PDU to the base station, wherein the step of generating the L2 PDU comprises adding the serving grant to the L2 PDU.

13 Claims, 6 Drawing Sheets

SYSTEMS AND METHODS FOR TRANSMITTING SERVING GRANTS TO A SERVING BASE STATION

This application claims the benefit of U.S. Provisional Patent Application No. 61/162,732, filed on Mar. 24, 2009, which is incorporated by reference herein.

TECHNICAL FIELD

The invention relates to the transmission of scheduling information from a user equipment to a network node (e.g., a base station).

BACKGROUND

Enhanced uplink, also known as High-Speed Uplink Packet Access (HSUPA), has been introduced into wireless communication standards (e.g., standards developed through the 3rd Generation Partnership Project (3GPP)). In HSUPA, a user equipment (UE) may transmit data in the uplink (i.e., to a base station, such as a NodeB) using a channel knows as the Enhanced Dedicated Channel (E-DCH).

For HSUPA, a scheduler component of the base station is a key element because it decides when and at what data rate a UE is allowed to transmit. The scheduler makes its decision based on, among other things, the state of the transmission buffers of the UEs in communication with the base station. Accordingly, there is a mechanism for each UE in communication with the base station to transmit to the base station buffer status information and/or other information that can be used by the base station to, for example, make scheduling decisions. Such information transmitted to the base station by the UE is referred to as scheduling information (SI).

Dual Cell HSUPA (DC-HSUPA) is an extension of HSUPA. In DC-HSUPA, a UE may use two or more different E-DCH channels to transmit its data to the network. One of the E-DCH channels is the primary (or anchor) channel and the other channels are secondary channels. Hence, in DC-HSUPA, the UE may send SI using the primary channel and a secondary channel.

SUMMARY

As mentioned above, in DC-HSUPA, the UE may use both the primary channel and a secondary channel to communicate SI to the network. A problem we have encountered in DC-HSUPA is that, when the UE transmits SI to the network using both channels, there are times when the SI transmitted to the network using a secondary channel is identical to (or very similar to) the SI transmitted using the primary channel. Transmitting identical (or very similar) SI to the network introduces an extra overhead that does not provide any additional benefit.

To solve this problem we expand the definition of scheduling information to include serving grants maintained by the UE and modifying the format in which scheduling information may be transmitted to the network. By doing this, the UE can transmit substantially simultaneously to the network one set of SI in the primary channel (e.g., the SI that is defined in 3GPP TS 25.321 v8.4.0 Medium Access Control (MAC) protocol specification (release 8)) and a different set of SI in a secondary channel (e.g., one or more serving grants maintained by the UE). This has the advantage of not only reducing overhead, but also the advantage of providing additional information (i.e., the UE's serving grant value(s)) to the base station, which additionally may be useful to the base for any number of purposes.

Accordingly, one aspect of the invention provides a method, performed by a UE, for communicating a serving grant from the UE to a network node, where the UE is capable of communicating with the network node using at least two uplink channels, a primary channel and a secondary channel. In some embodiments, this method includes storing a serving grant in a storage unit of the UE, wherein the serving grant is associated with either the primary channel or the secondary channel and the serving grant indicates the maximum amount of a particular resource the UE is allowed to use in the uplink channel with which the serving grant is associated. The method also includes generating a layer two protocol data unit (L2 PDU) (e.g., a MAC PDU) and transmitting the L2 PDU to the network node. The step of generating the L2 PDU comprises: (a) adding to the L2 PDU the serving grant and/or (b) adding to the L2 PDU deactivation information indicating that the secondary channel should be deactivated.

In some embodiments, the step of generating the L2 PDU comprises adding to the L2 PDU the serving grant and information indicating the uplink channel with which the serving grant is associated.

In other embodiments, the step of generating the L2 PDU comprises adding to the L2 PDU the serving grant and a second serving grant, wherein the first recited serving grant is associated with the primary channel and the second serving grant is associated with the secondary channel.

In some embodiments, the MAC PDU comprises a scheduling information (SI) component, and the step of generating the MAC PDU comprises including the serving grant in the SI component of the MAC PDU. In some embodiments, the step of generating the MAC PDU further comprises including in the SI component an uplink power headroom (UPH) value. In some embodiments, the MAC PDU further comprises a header component and a payload component that immediately follows the header component, and the SI component immediately follows the payload component. In other embodiments, the MAC PDU does not include a header component or a payload component.

In some embodiments, the MAC PDU comprises a scheduling information (SI) component, and the step of generating the MAC PDU comprises including in the SI component of the MAC PDU: (a) the serving grant or the deactivation information and (b) a format value indicating the format of the SI component.

In another aspect, the invention provides an improved UE. In some embodiments, this improved UE includes: a data storage unit for storing a serving grant, wherein the serving grant is associated with either a primary channel or a secondary channel and the serving grant indicates the maximum amount of a particular resource the mobile terminal is allowed to use in the channel with which the serving grant is associated; a layer one (L1) processing unit configured to transmit layer two (L2) protocol data units (PDUs) to the network node; and a L2 processing unit coupled to the L1 processing unit and the storage unit and configured to generate L2 PDUs. Preferably, the L2 processing unit is configured such that the L2 processing unit is operable to: (1) retrieve the serving grant from the storage unit; (2) add the serving grant to an L2 PDU; and (3) provide the L2 PDU containing the serving grant to the L1 processing unit for transmission to the network node.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
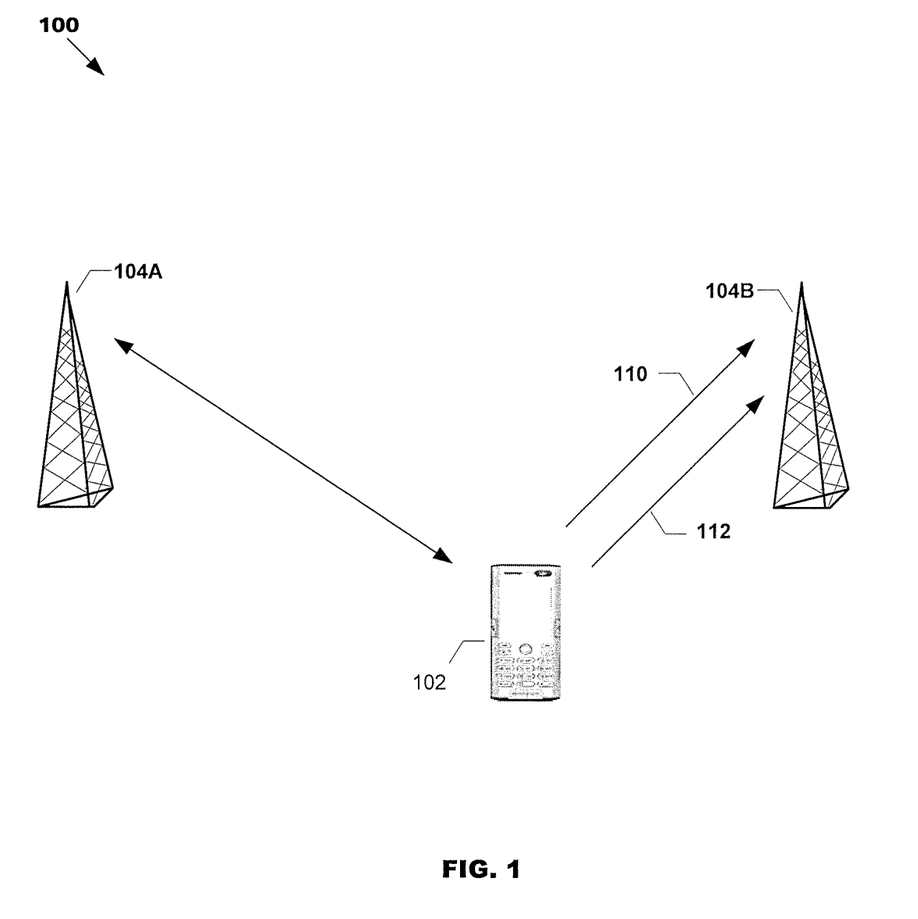
FIG. 1 illustrates a communication system.

Referring now to FIG. 1, FIG. 1 illustrates a communication system 100 that includes a user equipment (UE) 102 (e.g., a mobile phone or other communication device), a serving base station 104B and a non-serving base station 104a. While only a single UE and only two base stations are shown, this is done merely for convenience, as communication system 100 may, obviously, include more UE's and base stations as well as other network nodes.

As shown in FIG. 1, UE 102 may communicate with base station 104b using at least two uplink channels (e.g. two E-DCH channels): a first uplink channel 110 (a.k.a. the "primary" uplink channel 110) and a second uplink channel 112 (a.k.a., a "secondary" uplink channel). As also shown in FIG. 1, UE 102 may also communicate with base station 104a.

As discussed in the background section, base station 104b may control when and at what data rate UE 102 is allowed to transmit data on an uplink channel (i.e., channel 110 and 112). In some embodiments, base station 104b controls the UE data rate on a particular uplink channel by transmitting to UE 102 certain messages that cause UE 102 to update a particular value that indicates a maximum amount of a particular resource the UE is allowed to use in transmitting data on the particular uplink channel. This value, which is maintained by UE 102 (i.e., stored and updated in UE 102) and is associated with the particular uplink channel, is known as a "serving grant (SG)". UE 102 may maintain more than one serving grant. For example, UE 102 may maintain one serving grant for the primary uplink channel 110 and another serving grant for each other secondary uplink channel 112. In some embodiments, a serving grant indicates a maximum ratio of enhanced uplink dedicated physical data channel (E-DPDCH) power over dedicated physical control channel (DPCCH) power. One particular message that base station 104b may send to UE 102 to cause UE 102 to update a serving grant is known as an "absolute grant." Another message that base station 104b may send to UE 102 to cause UE 102 to update the serving grant is known as a "relative grant." A non-serving base station (e.g., base station 104a) may also send relative grants to UE 102 to cause UE 102 to update a serving grant associated with either the UE's primary or secondary uplink channel.

Figure 2:
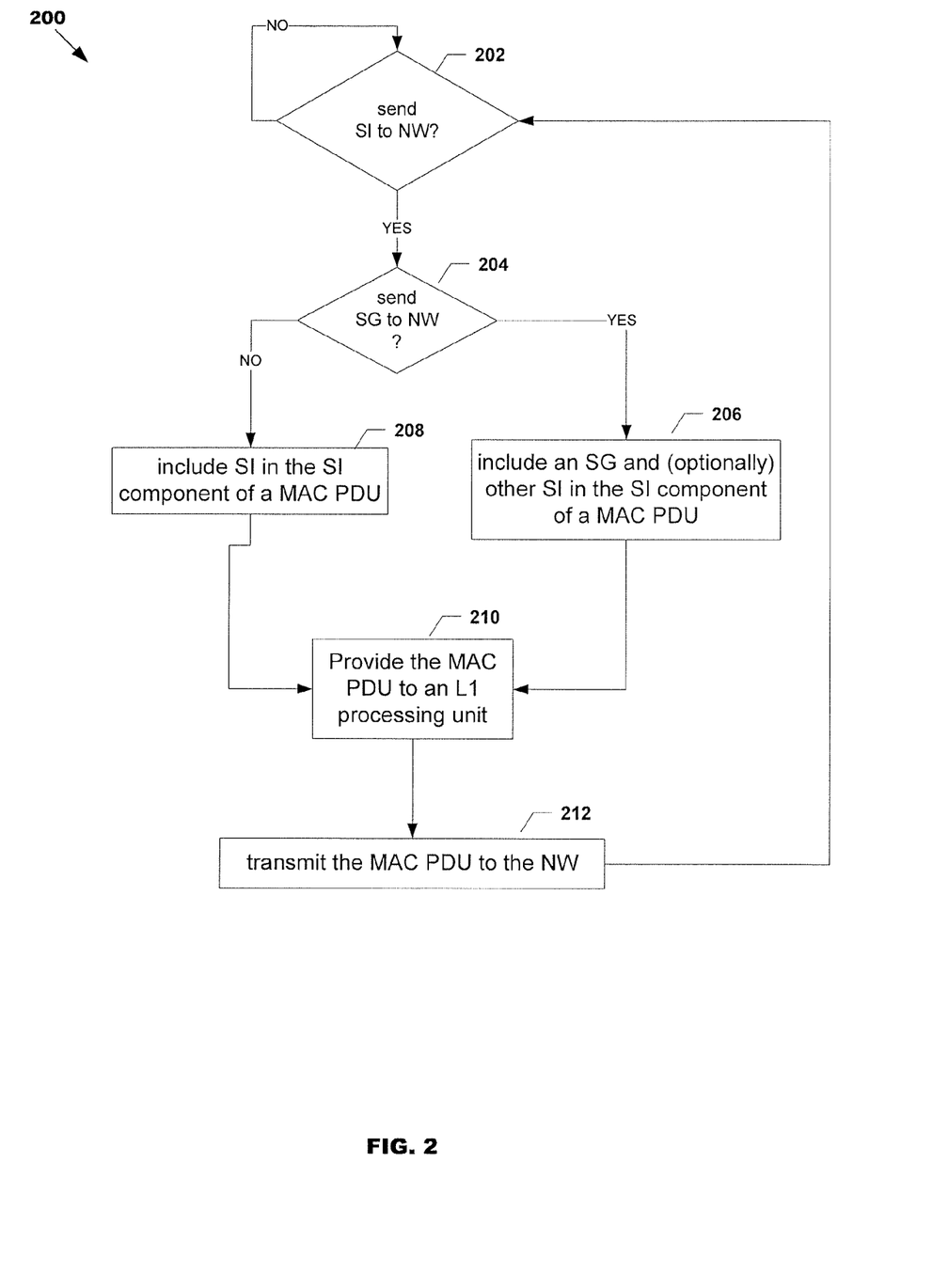
FIG. 2 is a flow chart illustrating a processes according an embodiment of the invention.

Referring now to FIG. 2, FIG. 2 is a flow chart illustrating a process 200, according to some embodiments, that may be performed by UE 102.

Process 200 may begin in step 202, where UE 102 determines whether it should send scheduling information (SI) to base station 104b (or "node 104b"). In some embodiments, UE 102 is configured such that it should send SI to node 104b whenever it has the opportunity and/or whenever a certain timer expires. For example, UE 102 may be configured to transmit periodically to node 104b SI for the primary channel 110 and SI for the secondary channel 112 (assuming the secondary channel is activated). If UE 102 determines that it should send SI to node 104b, then process 200 may proceed to step 204. In step 204, UE 102 determines whether it should send a serving grant to node 104b. In some embodiments, the determination may be based on whether UE 102 has received any relative grants from any non-serving base stations and/or whether the absolute difference between a serving grant for a particular channel and the most recent absolute grant value for the particular channel exceeds a threshold. Thus, for example, in step 204 UE 102 will determine that it should send to node 104b a serving grant associated with a particular channel if it has received from a non-serving base station a relative grant for the particular channel or if the difference between the serving grant and the absolute grant value is greater than a predetermined threshold.

If UE 102 determines that it should send an SG to node 104b, then, in response, process proceeds to step 206, otherwise it proceeds to step 208. In step 206, UE 102 (or, more specifically for example, a layer two (L2) processing unit of UE 102) may include an SG and (optionally) other SI in an SI component of a L2 protocol data unit (PDU), such as a MAC PDU. In step 208, UE 102 may include SI in the SI component of the MAC PDU (e.g., the conventional SI and/or other SI). Next (step 210), the MAC PDU is provided to a layer one (L2) processing unit. For example, in step 210, the L2 processing unit may, after generating the MAC PDU that includes the SG, signal the L1 processing unit that a MAC PDU is available for transmission or simply place the PDU in a queue. Next (step 212), the MAC PDU is transmitted to node 104b. Preferably, if the MAC PDU includes an SG in its SI component, the secondary uplink channel is used to transmit the MAC PDU.

Figure 3:
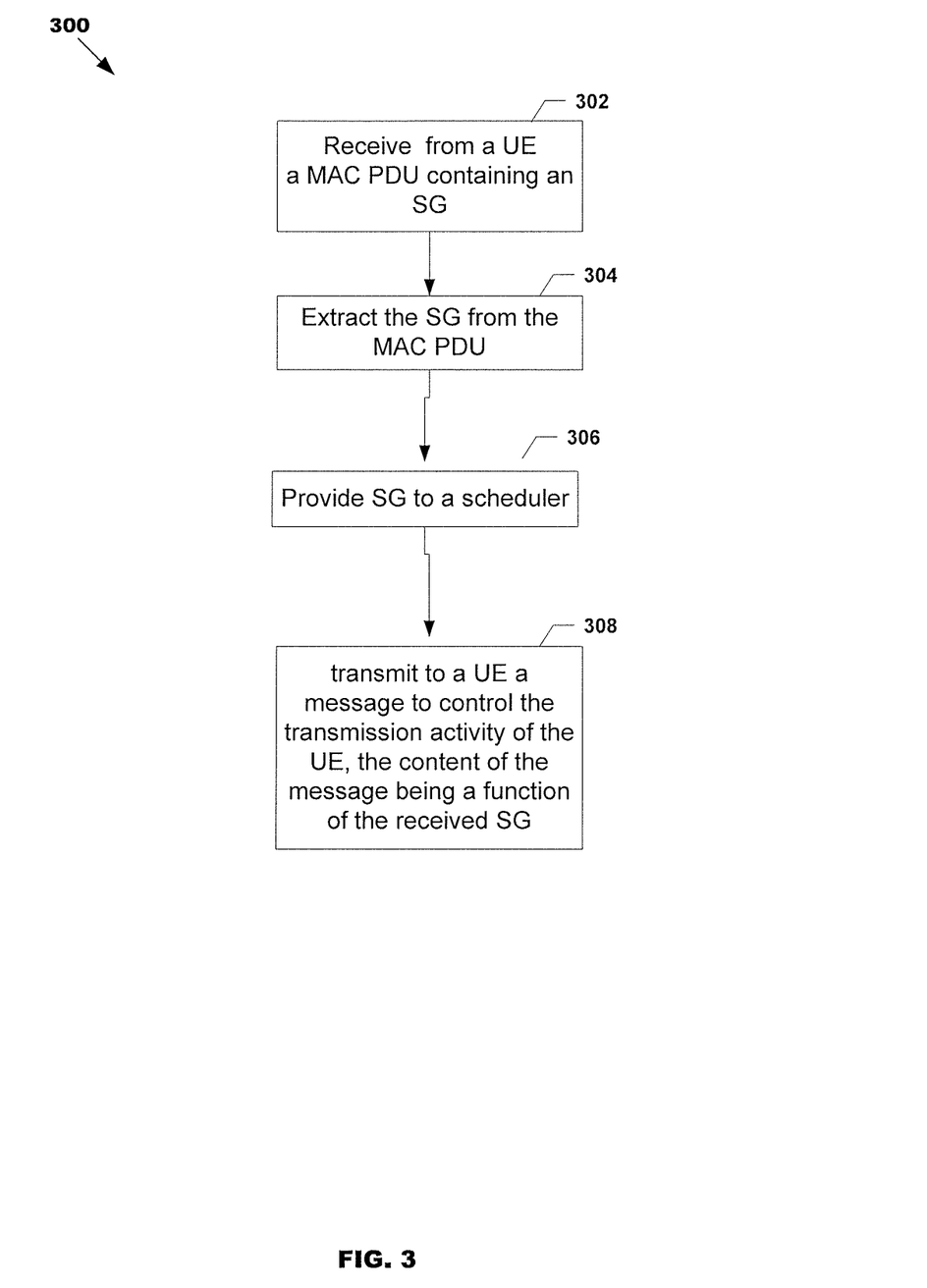
FIG. 3 is a flow chart illustrating a processes according an embodiment of the invention.

Referring now to FIG. 3, FIG. 3 is a flow chart illustrating a process 300, according to some embodiments, that may be performed by node 104b. Process 300 may begin in step 302 where node 104b receives from UE 102 a MAC PDU containing an SG located in the SI component of the MAC PDU. Next (step 304), node 104b extracts the SG from the MAC PDU. Next (step 306), the SG together with information indicating the channel with which it is associated, is provided to a scheduler, which may use the SG in a scheduling algorithm. Next (step 308), node 104b transmits to UE 102 a message to control the transmission activity of UE 102 (e.g., the message may influence when the UE is able to transmit data using an uplink channel and/or the maximum data rate for the transmission). The content of the message transmitted in step 308 may be a function of the SG received in step 302.

Figure 4A:
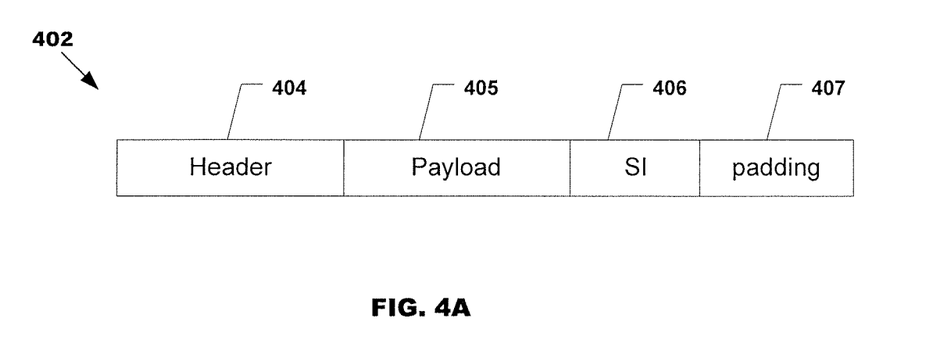
FIGS. 4A-4B illustrate various formats for a MAC PDU.
Figure 4B:
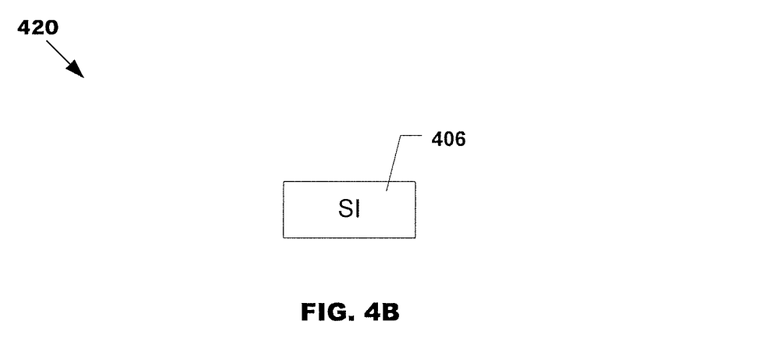

Referring now to FIGS. 4A and 4B, these figures illustrate a first MAC PDU format 402 (see FIG. 4A) and a second MAC PDU format 420 (see FIG. 4B). As shown in FIG. 4A, MAC PDU format 402 includes a header component 404, a data payload component 405 that immediately follows header component 404, an SI component 406 that immediately follows payload component 405, and a padding component 407 that immediately follows SI component 406. The data payload component 405 is for containing data received from a higher layer. The SI component is for containing, among other things, scheduling information. As shown in FIG. 4B, MAC PDU format 420 consists solely of an SI component.

When UE 102 generates a MAC PDU in step 206 or 208, UE 102 may use format 402 or format 420, depending on the circumstances.

Figure 5A:
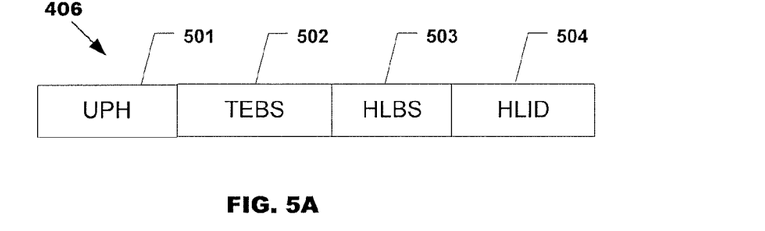
FIGS. 5A-5E illustrate various formats for an SI component of a MAC PDU.

Referring now to FIGS. 5A-5E, these figures illustrate exemplary formats for the SI component 406 of a MAC PDU. FIG. 5A illustrates the conventional format for SI component 406. In this format, SI component 406 includes an uplink power headroom (UPH) field 501 for storing a UPH value, a total E-DCH buffer status (TEBS) field 502 for storing a TEBS value, a highest priority logical channel buffer status (HLBS) field 503 for storing an HLBS value, and a highest priority logical channel ID (HPLID) field 504 for storing an HPLID value.

Figure 5B:
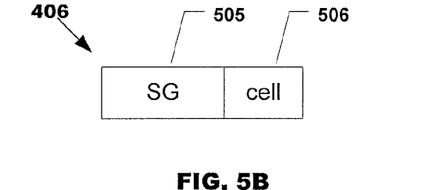

FIG. 5B illustrates a format for SI component 406 according to a second embodiment. As shown in FIG. 5B, in this embodiment, SI component 406 consists of an SG field 505 for storing an SG and a cell field 506 for storing information (e.g., a bit) indicating the channel with which the SG stored in the SG field 505 is associated. SG field 505 may be a 5 bit field and cell field 506 may be a 1 bit field (but other sizes are possible).

Figure 5C:
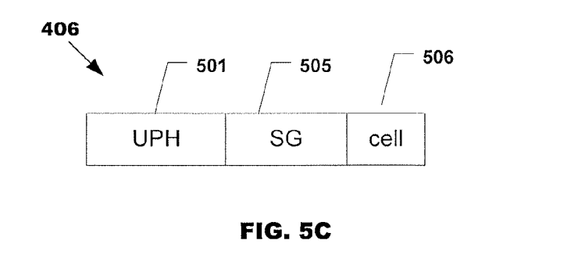

FIG. 5C illustrates a format for SI component 406 according to a third embodiment. As shown in FIG. 5C, in this embodiment, SI component 406 consists of a conventional SI field (e.g, a UPH field 501 as shown in the drawing), SG field 505, and cell field 506.

Figure 5D:
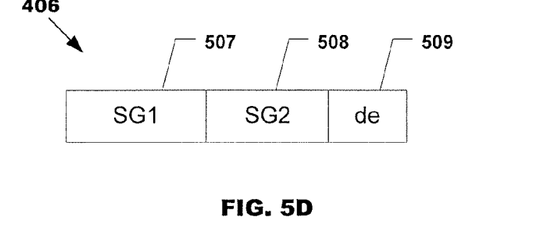

FIG. 5D illustrates a format for SI component 406 according to a fourth embodiment. As shown in FIG. 5D, in this embodiment, SI component 406 includes a first SG field 507 for storing the SG associated with the primary channel followed by a second SG field 508 for storing the SG associated with the secondary channel. As further shown, SI component 406 may also include a deactivation field 509 for signaling to node 104b a request to deactivate/activate that the secondary channel.

Figure 5E:
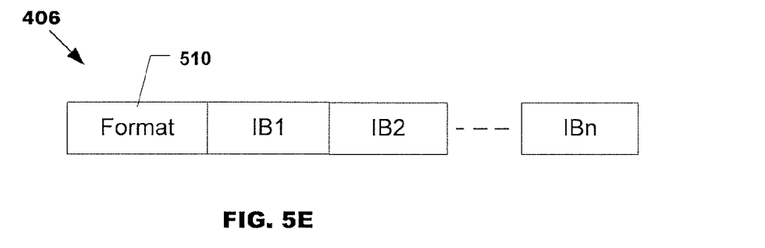

FIG. 5E illustrates a format for SI component 406 according to a fifth embodiment. As shown in FIG. 5D, in this embodiment, SI component 406 includes a format field 510 and zero or more information block fields. Format field 510 is used to indicate the information contained in SI component. For example, format field may be a two bit field such that the format of the SI component will depend on how the bits are set. As an example: if the bits are set to 00, then this is a request to activate/deactivate the secondary uplink channel and the SI component will not include any information blocks; if the bits are set to 01, then the first information block filed will contain a UPH value and the second information block filed will contain the SG for the primary channel; if the bits are set to 10, then the first information block filed will contain a UPH value and the second information block filed will contain the SG for the secondary channel; and if the bits are set to 11, then the first information block filed will contain a UPH value, the second information block filed will contain the SG for the primary channel, and the third information block filed will contain the SG for the secondary channel.

The above described formats for SI component 406 are just exemplary. Numerous other formats are possible. For example, deactivation field 509 may be added to any one of the embodiments. Similarly, any one or more of the conventional SI fields may be added to any one of the embodiments.

Referring back to step 206 of process 200 (see FIG. 2), when UE 102 performs this step, UE 102 will include an SG in the SI component, and UE 102 may include additional information in the SI component depending on the SI component format that is used. For example, if the format shown in FIG. 5C is used, then when UE 102 performs step 206, UE 102 will not only include the SG in SG field 505, but will also include an channel identifier in cell field 506 and a UPH value in UPH field 501. Likewise, if the format shown in FIG. 5D is used, then when UE 102 performs step 206, UE 102 will include the SG associated with the primary channel in field 507 and will include the SG associated with the secondary channel in field 508, which immediately follows field 507.

Figure 6:
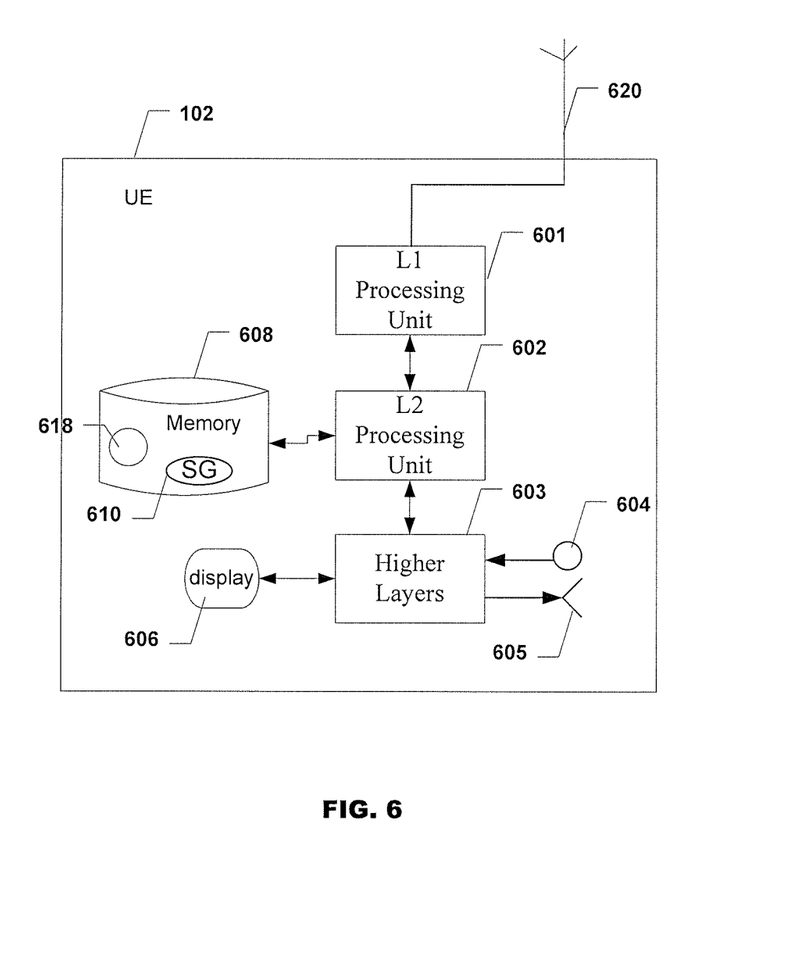
FIG. 6 is a functional block diagram of a UE according to some embodiments.

Referring now to FIG. 6, FIG. 6 illustrates a block diagram of UE 102 according to some embodiments. As shown in FIG. 6, UE 102 may include a L1 processing unit 601 for implementing physical layer functionality. Unit 601 may be coupled to an antenna 610. UE 102 may also include an L2 processing unit 602 for implementing data link layer functionality (e.g., MAC layer functionality). For example, unit 602 is preferably configured to implement the steps discussed above with respect to the flow chart shown in FIG. 2. Unit 602 may be coupled to unit 601 and to a storage unit 608, which can be used to store one or more SGs 610. UE 102 may further include a higher layer processing unit 603. This processing unit may be coupled to input/output devices. For example, in the case where UE 102 is a mobile phone, the input/output device may include a microphone 604, a speaker 605, and a display 606. Each of the above mentioned processing units may include one or more microprocessors and/or one or more circuits, such as an application specific integrated circuit (ASIC), Field-programmable gate arrays (FPGAs), etc. Storage unit 608 may include one or more non-volatile storage devices and/or one or more volatile storage devices (e.g., random access memory (RAM)). In embodiments where L2 processing unit 602 includes a microprocessor, a computer program 618 (i.e., software) may be stored in storage unit 608. For example, the computer program 618 may be stored using a computer readable means, such as, but not limited to, magnetic media (e.g., a hard disk), optical media (e.g., a DVD), memory devices (e.g., random access memory), etc. In some embodiments, computer program 618 is configured such that when computer program 618 is run, UE 102 is operable to perform steps described above (e.g., steps describe above with reference to the flow chart shown in FIG. 2). In other embodiments, UE 102 is configured to perform steps described above without the need for software 618. That is, for example, L2 processing unit 602 may consist merely of one or more ASICs. Hence, the features of the present invention described above may be implemented in hardware and/or software.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a UE for communicating a serving grant to a network node, wherein the UE is capable of communicating with the network node using at least two uplink channels, a primary channel and a secondary channel, the method comprising:

storing a serving grant in a storage unit, wherein the serving grant is associated with either the primary channel or the secondary channel and the serving grant indicates the maximum amount of a particular resource the UE is allowed to use in the uplink channel with which the serving grant is associated;

generating a layer two protocol data unit (L2 PDU); and transmitting the L2 PDU to the network node, wherein the step of generating the L2 PDU comprises adding to the L2 PDU at least one of:
  (a) deactivation information indicating that the secondary channel should be deactivated,
  (b) the serving grant and information indicating the uplink channel with which the serving grant is associated, and
  (c) the serving grant and a second serving grant, wherein the first recited serving grant is associated with the primary channel and the second serving grant is associated with the secondary channel; and wherein the L2 PDU comprises a scheduling information (SI) component, and the step of generating the L2 PDU comprises including in the SI component of the L2 PDU:
  (a) the serving grant or the deactivation information and
  (b) a format value indicating a format of the SI component.

2. The method of claim 1, wherein the L2 PDU is a media access control (MAC) PDU.

3. The method of claim 2, wherein the MAC PDU comprises a scheduling information (SI) component, and the step of generating the MAC PDU comprises including the serving grant in the SI component of the MAC PDU.

4. The method of claim 3, wherein the MAC PDU further comprises a header component and a payload component that immediately follows the header component, and the SI component immediately follows the payload component.

5. The method of claim 3, wherein the MAC PDU does not include a header component or a payload component.

6. The method of claim 3, wherein the step of generating the MAC PDU further comprises including in the SI component of the MAC PDU an uplink power headroom (UPH) value.

7. The method of claim 1, wherein the serving grant indicates a maximum ratio of enhanced uplink dedicated physical data channel (E-DPDCH) power over dedicated physical control channel (DPCCH) power.

8. A mobile terminal capable of communicating with a network node using at least two uplink channels at the same time, a primary channel and a secondary channel, the mobile terminal comprising:

a storage unit for storing a serving grant, wherein the serving grant is associated with either the primary channel or the secondary channel and the serving grant indicates the maximum amount of a particular resource the mobile terminal is allowed to use in the uplink channel with which the serving grant is associated;

a layer one (L1) processing unit configured to transmit layer two (L2) protocol data units (PDUs) to the network node; and a L2 processing unit coupled to the L1 processing unit and the storage unit and configured to generate L2 PDUs, wherein the L2 processing unit is configured such that the L2 processing unit is operable to:
  (1) retrieve the serving grant from the storage unit;
  (2) add the serving grant to an L2 PDU;
  (3) further add to the L2 PDU at least one of: (a) deactivation information indicating that the secondary channel should be deactivated, (b) information indicating the uplink channel with which the serving grant is associated and (c) a second serving grant, wherein the first serving grant is associated with the primary channel and the second serving grant is associated with the secondary channel; and
  (4) provide the L2 PDU containing the serving grant to the L1 processing unit for transmission to the network node; and wherein the L2 PDU comprises a scheduling information (SI) component, and the L2 processing unit is configured to add the serving grant to the L2 PDU by including the serving grant in the SI component of the L2 PDU, and wherein the L2 processing unit is further configured such that it is operable to add to the SI component of the L2 PDU a format value indicating a format of the SI component in addition to the serving grant.

9. The mobile terminal of claim 8, wherein the L2 PDU is a media access control (MAC) PDU.

10. The mobile terminal of claim 9, wherein the MAC PDU further comprises a header component and a payload component that immediately follows the header component, and the SI component immediately follows the payload component.

11. The mobile terminal of claim 9, wherein the MAC PDU does not include a header component or payload component.

12. The mobile terminal of claim 9, wherein the L2 processing unit is further configured such that it is operable to add to the SI component of the MAC PDU a uplink power headroom value in addition to the serving grant.

13. The mobile terminal of claim 8, wherein the serving grant indicates a maximum ratio of enhanced uplink dedicated physical data channel (E-DPDCH) power over dedicated physical control channel (DPCCH) power.

* * * * *

UNITED STATES PATENT AND TRADEMARK OFFICE
CERTIFICATE OF CORRECTION

| | | |
|---|---|---|
| PATENT NO. | : 8,824,362 B2 | Page 1 of 1 |
| APPLICATION NO. | : 12/729704 | |
| DATED | : September 2, 2014 | |
| INVENTOR(S) | : Pradas et al. | |

It is certified that error appears in the above-identified patent and that said Letters Patent is hereby corrected as shown below:

On the title page

Item 75, under "Inventors", in Column 1, Line 3, delete "Sagfors," and insert -- Sågfors, --, therefor.

Item 75, under "Inventors", in Column 1, Line 3, delete "Kyrkslatt" and insert -- Kyrkslätt --, therefor.

In the specification

In Column 1, Line 6, delete "61,162,732," and insert -- 61/162,732, --, therefor.

In the claims

In Column 8, Line 40, in Claim 11, delete "or payload" and insert -- or a payload --, therefor.

In Column 8, Line 44, in Claim 12, delete "headroom value" and insert -- headroom (UPH) value --, therefor.

Signed and Sealed this
First Day of March, 2016

Michelle K. Lee
*Director of the United States Patent and Trademark Office*